(12) United States Patent
Pathmasuntharan et al.

(10) Patent No.: US 6,955,299 B1
(45) Date of Patent: Oct. 18, 2005

(54) SYSTEM AND METHOD FOR USING A SMART CARD

(75) Inventors: Jaya Shankar Pathmasuntharan, Singapore (SG); Cheng Lin Tan, Singapore (SG)

(73) Assignee: Centre for Wireless Communications of National University of Singapore, Singapore Science Park II (SG)

( * ) Notice: Subject to any disclaimer, the term of this patent is extended or adjusted under 35 U.S.C. 154(b) by 0 days.

(21) Appl. No.: 09/466,144

(22) Filed: Dec. 17, 1999

(51) Int. Cl.[7] .............................................. G06K 19/06
(52) U.S. Cl. ......................... 235/492; 235/380; 705/41
(58) Field of Search ................................ 235/380, 379, 235/382, 375, 492, 381; 705/41–44

(56) References Cited

U.S. PATENT DOCUMENTS

| | | | |
|---|---|---|---|
| 4,614,861 A | * | 9/1986 | Pavlov et al. ............... 235/380 |
| 4,692,601 A | * | 9/1987 | Nakano ....................... 235/380 |
| 4,766,293 A | * | 8/1988 | Boston ........................ 705/41 |
| 4,864,109 A | * | 9/1989 | Minematsu ................. 235/379 |
| 4,937,436 A | * | 6/1990 | Engise et al. ............... 235/380 |
| 4,973,828 A | * | 11/1990 | Naruse et al. ............... 235/492 |
| 5,034,597 A | * | 7/1991 | Atsumi et al. .............. 235/380 |
| 5,180,902 A | * | 1/1993 | Schick et al. ............... 235/380 |
| 5,418,353 A | * | 5/1995 | Katayama et al. .......... 235/492 |
| 5,495,098 A | * | 2/1996 | Pailles et al. ............... 235/492 |
| 5,577,121 A | * | 11/1996 | Davis et al. .................. 705/67 |
| 5,578,808 A | * | 11/1996 | Taylor ........................ 235/380 |
| 5,721,781 A | | 2/1998 | Deo et al. |
| 5,727,230 A | * | 3/1998 | Fujioka .......................... 710/5 |
| 5,744,787 A | * | 4/1998 | Teicher ...................... 235/380 |
| 5,748,737 A | * | 5/1998 | Daggar ....................... 235/379 |
| 5,847,447 A | * | 12/1998 | Rozin et al. ................ 235/451 |
| 5,889,866 A | * | 3/1999 | Cyras et al. .................. 380/25 |
| 5,896,325 A | * | 4/1999 | Fujioka ................. 365/189.07 |
| 5,929,414 A | * | 7/1999 | Saitoh ........................ 235/380 |
| 5,936,221 A | | 8/1999 | Corder et al. |
| 5,955,961 A | * | 9/1999 | Wallerstein ................. 235/380 |
| 6,036,100 A | * | 3/2000 | Asami ........................ 235/492 |
| 6,047,888 A | * | 4/2000 | Dethloff ..................... 235/380 |
| 6,062,472 A | * | 5/2000 | Cheung ...................... 235/380 |
| 6,070,794 A | * | 6/2000 | Niwata et al. .............. 235/380 |
| 6,070,795 A | * | 6/2000 | Feiken ....................... 235/380 |
| 6,089,451 A | * | 7/2000 | Krause ....................... 235/380 |
| 6,095,416 A | * | 8/2000 | Grant et al. ................ 235/380 |
| 6,111,506 A | * | 8/2000 | Yap et al. ................ 340/572.1 |
| 6,119,945 A | * | 9/2000 | Muller et al. ............... 235/492 |
| 6,126,071 A | * | 10/2000 | Yoshimura ................. 235/382 |
| 6,142,369 A | * | 11/2000 | Jonstromer ................. 235/380 |
| 6,164,549 A | * | 12/2000 | Richards .................... 235/492 |
| 6,247,644 B1 | * | 6/2001 | Horne et al. ................ 235/492 |
| 6,257,486 B1 | * | 7/2001 | Teicher et al. .............. 235/380 |
| 6,282,656 B1 | * | 8/2001 | Wang ......................... 713/201 |
| 6,352,202 B2 | * | 3/2002 | Takiguchi et al. .......... 235/451 |

FOREIGN PATENT DOCUMENTS

| | | | | |
|---|---|---|---|---|
| EP | 949593 A2 | * | 10/1999 | ............ G07F/7/08 |
| JP | 4-314187 | * | 11/1992 | |
| JP | 8-187346 | * | 7/1996 | |
| JP | 11-191182 | * | 7/1999 | |

\* cited by examiner

*Primary Examiner*—Thien M. Le
*Assistant Examiner*—Uyen-Chau N. Le
(74) *Attorney, Agent, or Firm*—Blakely, Sokoloff, Taylor & Zafman LLP

(57) ABSTRACT

A system and method for using a smart card. The system includes a smart card enabler receiving a first identification key from a smart card. The smart card enabler compares the first identification key with a second identification key. If the first identification key matches the second identification key, the smart card enabler enables the smart card to function with a smart card reader. Also, if information stored in a smart card is incapable of being retrieved from the smart card, the transaction information stored in the smart is recovered by using information stored in a smart card enabler.

26 Claims, 8 Drawing Sheets

SYSTEM AND METHOD FOR USING A SMART CARD

FIELD OF THE INVENTION

The present invention pertains to the field of portable electronic devices and systems to access these devices. More particularly, the present invention relates to a system and method for using portable electronic devices and recovering information from portable electronic devices.

BACKGROUND OF THE INVENTION

Portable electronic devices are devices, which are typically carried by a user, for storing and processing electronic information. A common use for portable electronic devices is storing cash value electronically ("electronic cash value information"), which is used in place of hard currency (i.e., cash or coins) to perform a financial transaction such as purchasing goods or services. A common portable electronic device used for purchasing goods and services is an "electronic token," which stores electronic cash value information. An electronic token is a credit card, debit card, or stand alone card (commonly referred to as a "smart card") having embedded micro-circuitry to store and process electronic cash value information for performing financial transactions. Because hard currency is represented in electronic form and transactions are performed electronically, the smart card allows a user to carry less hard currency and reduce the need for exact change.

For example, to purchase goods or services at a gasoline station, pay phone, restaurant, supermarket, retail store, convenience store, and etc., a user may insert a smart card (for a contact smart card) into a smart card reader, and the smart card reader makes contact with the smart card. After making contact with the smart card reader, the smart card exchanges electronic cash value information with the smart card reader to perform the transaction.

Alternatively, a user may place the smart card (for a contact-less smart card) in front of the smart card reader, and the smart card exchanges electronic cash value information with the smart card reader by using radio frequency (RF) signals to perform the transaction. If the appropriate electronic cash value information is exchanged, the smart card reader and the smart card perform the transaction for the purchase of goods or services.

A problem associated with using a smart card is security. A smart card with no security procedure improves transaction efficiency, however, if the smart card is lost having no security procedure an unauthorized user may easily use the smart card. A prior security procedure for a smart card is requiring a password or personal identification number ("PIN"). For the password or PIN security procedure, a user inputs a password or PIN that must be authenticated in order for a user to use the smart card to perform a transaction.

A disadvantage with using a password or PIN security procedure is that the password or PIN may be easily copied or retrieved by an unauthorized user. Another disadvantage with using the password or PIN security procedure is that even if the correct password or PIN is used, there is no guarantee that the authorized user is using the smart card.

A more sophisticated security procedure for a smart card is using biometrics such as verbal verification, dynamic handwritten signature recognition, fingerprints, hand geometry, retinal scan, and etc., to verify that an authorized user is using the smart card. Although such biometrics ensures that only an authorized user is using the smart card, such biometrics requires sophisticated hardware and extensive computing power, which increases the cost to implement and maintain such a security procedure. Another disadvantage of using biometrics is that it increases the complexity of using the smart card to perform a transaction.

A disadvantage in using both the password or PIN security procedure and the biometrics security procedure is that such procedures increase the processing time to perform a transaction. For example, the password or PIN security procedure requires time for a user to enter the password or PIN and the biometrics security procedure requires a user to wait for the biometrics to determine if the user is valid before a transaction can be performed.

Another problem associated with using a smart card is recovering information stored in the smart card when it becomes lost, damaged, or destroyed. For example, the password or PIN security procedure and the biometrics security procedure do not address the problem of recovery of electronic cash value information stored in the smart card or guarantees that such information can be retrieved when the smart card is lost, damaged, or destroyed. Without a procedure to recover electronic cash value information in a smart card, a user of a smart card will be wary of storing large amounts of electronic cash value information in the smart card.

SUMMARY OF THE INVENTION

According to one embodiment of the present invention, a method is provided in which a smart card enabler receives a first identification key from a smart card. The smart card enabler compares the received first identification key with a second identification key. If the received first identification key matches the second identification key, the smart card enabler enables the smart card to function with a smart card reader. In one embodiment, if information stored in a smart card is incapable of being retrieved from the smart card, the information stored in the smart is recovered by using information stored in a smart card enabler.

Other features and advantages of the present invention will be apparent from the accompanying drawings, and from the detailed description, which follows below.

BRIEF DESCRIPTION OF THE DRAWINGS

The present invention is illustrated by way of example and not limited by the figures of the accompanying drawings, in which like references indicate similar elements and in which.

DETAILED DESCRIPTION

Figure 1A:
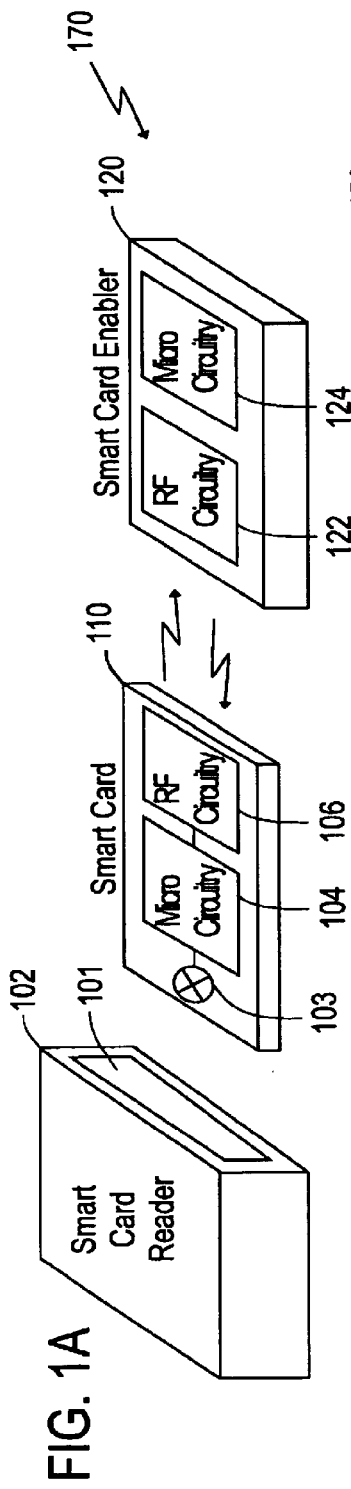
FIG. 1a is an illustration of an exemplary smart card system suitable for practicing the present invention.

According to embodiments described herein, the system includes a smart card, smart card enabler, and a smart card reader. In one embodiment, the smart card enabler receives a first identification key from a smart card. The smart card enabler compares the received first identification key with a second identification key. If the received first identification key matches the second identification key, the smart card enabler enables the smart card to function with a smart card reader. If the received first identification key does not match the second identification key, the smart card will not function with the smart card reader. By requiring the smart card to be enabled by the smart card enabler in order for the smart card to function with the smart card reader, the present embodiment renders a smart card invalid and inoperable without a smart card enabler. Thus, an unauthorized user who does not have the smart card enabler for the smart card will not be able to use the smart card.

For one embodiment, if information stored in a smart card is incapable of being retrieved from the smart card, the information stored in the smart card is recovered by using information stored in a smart card enabler. Thus, if the smart card is lost, damaged, or destroyed, information stored in the smart card can be recovered by using information stored in the smart card enabler.

The following discussion is presented in the context of using a smart card to perform financial transactions. The following embodiments, however, are not limited to financial transactions and may be implemented to perform other types of transactions such as, for example, an e-mail transaction. The following embodiments are also not limited to a smart card and may be implemented with other types of portable electronic devices such as, for example, a personal data assistant, pager, and a wireless phone.

FIGS. 1*a* through 1*d* are illustrations of exemplary smart card systems for practicing the present invention. The exemplary smart card systems show a smart card reader, smart card, and smart card enabler. In one embodiment, the smart card is a portable electronic device, which is carried by a user, for performing a financial transaction such as, for example, purchasing goods or services. A transaction for the purchase of goods or services is performed when the smart card exchanges information such as, for example, electronic cash value information (hard currency represented in electronic form) with the smart card reader.

The smart card is responsible for storing and processing electronic cash value information that represents hard currency electronically to purchase goods or services. For example, the smart card may store electronic cash value information representing fifty dollars of hard currency electronically for the purchase of goods or services by a user of the smart card. Before a user can perform a transaction between the smart card and the smart card reader, the smart card is enabled by the smart card enabler. For one embodiment, the smart card is enabled in two instances. First, the smart card is enabled to function with the smart card reader by the smart card enabler. Second, the smart card is enabled to perform a transaction with the smart card reader by the smart card enabler. To enable the smart card to function with the smart card reader, an identification key of the smart card is authenticated by a smart card enabler. Also, to enable the smart card to perform a transaction with the smart card reader, a transaction key of the smart card needs to be authenticated by the smart card enabler.

The smart card enabler is responsible for enabling the smart card to function and perform a transaction with the smart card reader. In one embodiment the smart card enabler is a portable electronic device, which is carried by a user, for enabling the smart card. The smart card enabler enables remotely the smart card using radio frequency (RF) signals. Without the smart card enabler being within a close proximity, for example, a few meters away from the smart card, the smart card will not operate with the smart card reader to perform a transaction.

The smart card reader is responsible for communicating with the smart card to perform a transaction. For example, the smart card reader may deduct a value represented by the electronic cash value information stored in the smart card for the purchase of goods or services. In one embodiment, the smart card reader is an electronic device such as, for example, a computer terminal, which is responsible for receiving and transmitting information from and to the smart card in order for a transaction to be performed. The smart card reader may also receive and transmit other types of information such as, for example, initialization information, with the smart card.

Referring to FIG. 1*a*, an exemplary smart card system 170 shows a smart card reader 102, smart card 110, and smart card enabler 120. In one embodiment, smart card 110 is an electronic portable device, which is carried by a user, to perform a financial transaction. Smart card 110 is preferably the size of a credit card. Smart card 110 may also be of any size that is capable of being carried by a user. Smart card 110 also stores and processes electronic cash value information that represents hard currency in electronic form to purchase goods or services. For example, smart card 110 may store electronic cash value information representing fifty dollars, which is used by smart card reader 102, to purchase goods or services of up to fifty dollars. After a transaction is performed, smart card 110 stores a last transaction value resulting from the transaction, which represents the current amount of hard currency available to a user of smart card 110 after a transaction. For example, if a transaction for the purchase of a good or service requires an exchange of five dollars from the smart card having electronic cash value information representing fifty dollars to the smart card reader, smart card 110 will store a last transaction value of forty five dollars after the exchange as a result of the five dollar transaction.

Smart card 110 includes contact 103 and embedded micro-circuitry 104 and radio frequency RF circuitry 106. Micro-circuitry 104 and RF circuitry 106 are single wafer integrated circuits (IC), which are mounted within smart card 110. Contact 103 is an interface between smart card 110 and smart card reader 103. Contact 103 may be any type of interface such as, for example, a male/female connection interface, metal contact interface, PCMCIA connection interface or any like interfaces.

Smart card 110 stores and processes electronic cash value information in micro-circuitry 104. Smart card 110 communicates with smart card enabler 120 using RF signals through RF circuitry 106. Smart card 110 may use any known RF communication protocol to communicate with smart card enabler 120. Smart card 110 exchanges electronic cash value information with smart card reader 102 through contact 103. Smart card 110 may also exchange other types of information such as, for example, initialization information, with smart card reader 102.

Smart card enabler 120 is a portable electronic device that is carried by a user for enabling smart card 110 to function and perform a transaction with smart card reader 102. Smart card enabler 120 stores the same information stored in smart card 110 including an identification key, transaction key, and last transaction value. Smart card enabler 120 is preferably the size of a credit card. Smart card enabler 120 may also be of any size that is capable of being carried by a user. Alternatively, smart card enabler 120 may be embedded in a device typically carried by a user such as, for example, a wireless phone or watch. Smart card enabler 120 is also carried by a user to enable remotely smart card 110 using RF signals. Smart card enabler 120 may include its own power source (not shown) such as, for example, a battery.

Smart card enabler 120 includes embedded micro-circuitry 124 and radio frequency RF circuitry 122. Micro-circuitry 124 and RF circuitry 122 are single wafer integrated circuits (IC), which are mounted within smart card enabler 120. Smart card enabler 120 uses micro-circuitry 124 for storing an identification key, transaction key, and last transaction value, which is also stored in smart card 110. Smart card enabler 120 also uses micro-circuitry 124 to communicate enable signals such as, for example, an identification enable signal and a transaction enable signal, to smart card 110.

Smart card enabler 120 uses micro-circuitry 124 to compare a received identification key and transaction key from smart card 110 with a stored identification key and transaction key in order to communicate the identification enable signal and transaction enable signal to smart card 110. Smart card enabler 120 may also use micro-circuitry 124 to perform other functions such as, for example, receiving and processing external inputs. Smart card enabler 120 may also be constructed having external inputs such as, for example, a key pad, input buttons, and like inputs.

Smart card enabler 120 uses RF circuitry 122 for transmitting and receiving RF signals to and from smart card 110. Smart card enabler 120 uses RF circuitry 122 to receive signals representing an identification key, transaction key, and last transaction value from smart card 110. Smart card enabler 120 enables smart card 110 remotely using RF circuitry 122 by transmitting the identification enable signal and transaction enable signal to smart card 110 through RF circuitry 106. Smart card 110 is configured such that smart card 110 will not function with smart card reader 102 unless smart card 110 receives the identification enable signal from smart card enabler 120. Smart card 110 is also configured such that smart card 110 will not perform a transaction with smart card reader 102 unless smart card 110 receives the transaction enable signal from smart card enabler 120. After receiving the identification enable signal and transaction enable signal, smart card 110 may function and perform a transaction with smart card reader 102.

Smart card reader 102 is an electronic device that accesses electronic cash value information such as, for example, a last transaction value, stored in smart card 110 to perform a transaction. Smart card reader 102 may be a digital processing system such as, for example, a computer terminal. Smart card reader 102 is configured typically with an opening 101. Smart card 110 is inserted into smart card reader 102 through opening 101 to initiate a transaction. After smart card 110 is inserted into smart card reader 102, smart card reader 102 provides power to smart card 110 through contact 103, which "boots" up the smart card 110 to perform a transaction. Smart card 110, however, will not function or perform a transaction with smart card reader 102 unless it has been enabled by smart card enabler 120. Without smart card enabler 120 being within a close proximity to enable smart card 110, a transaction is not performed between smart card 110 and smart card reader 102.

Figure 1B:
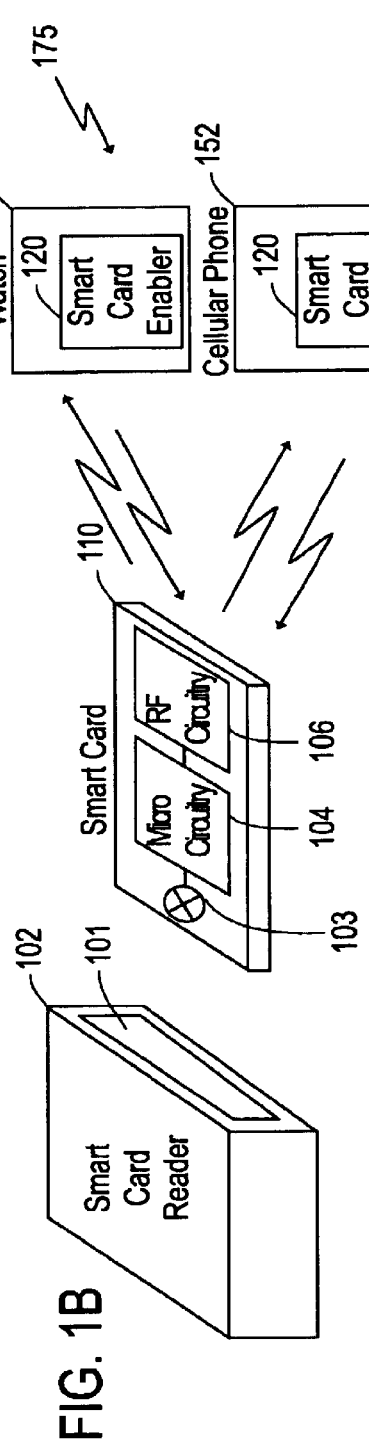
FIG. 1b is an illustration of an exemplary smart card system suitable for practicing the present invention.

FIG. 1*b* is an illustration of an exemplary smart card system 175 including a smart card reader 102, smart card 110, and a smart card enabler 120. For purposes of explanation, smart card reader 102, smart card 110, and smart card enabler 120 of exemplary smart card system 175 are constructed and operate in a similar manner as in exemplary smart card system 170. In one embodiment, smart card enabler 120 is contained within a wearable device such as, for example, a watch 150 or wireless phone 152. Smart card enabler 120 may be contained in or on any wearable device such as, for example, a pager, personal data assistant, and other like devices.

Figure 1C:
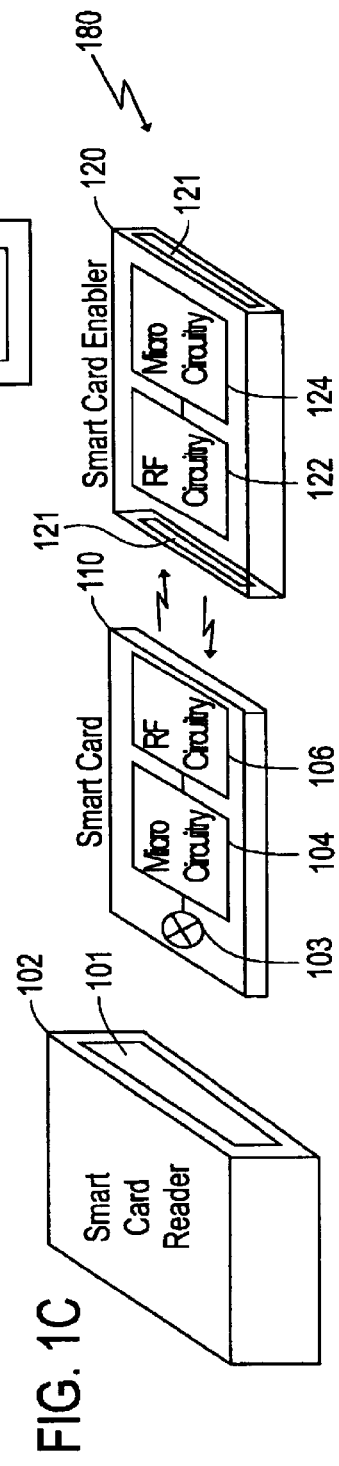
FIG. 1c is an illustration of an exemplary smart card system suitable for practicing the present invention.

FIG. 1*c* is an illustration of an exemplary smart card system 180 including a smart card reader 102, smart card 110, and smart card enabler 120. For purposes of explanation, smart card reader 102 and smart card 110 of exemplary smart card system 180 are constructed and operate in a similar manner as in exemplary smart card systems 170 and 175. Also, for purposes of explanation, smart card enabler 120 includes embedded RF circuitry 122 and micro-circuitry 124 that are constructed and operate in a similar manner as in smart card enabler 120 of exemplary smart card systems 170 and 175.

In one embodiment, smart card enabler 120 is constructed with openings 121 for inserting smart card 110 into smart card enabler 120. Smart card enabler 120 may also contain a single opening 121 on either side of smart card enabler 120 for inserting smart card 110 into smart card enabler 120. Smart card enabler 120 may also be connected with smart card 110 using other type of configurations such as, for example, smart card enabler 120 may snap on to smart card 110 or smart card enabler 120 may attach to smart card 110 using velcro or other like attachments. Smart card enabler 120 and smart card 110 may also operate as a single unit, which is inserted into smart card reader 102 through opening 121 as a single unit. Smart card 110 and smart card enabler 120 may also have a connection interface (not shown) to communicate with each other directly.

Figure 1D:
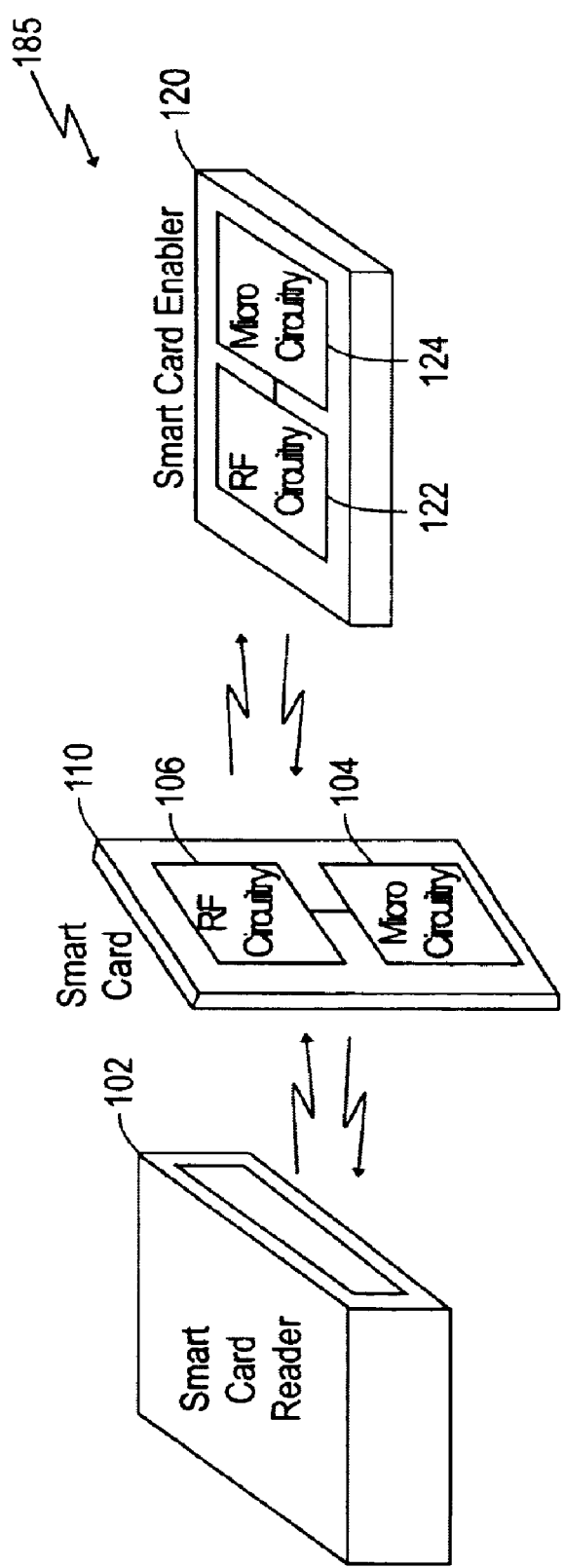
FIG. 1d is an illustration of an exemplary smart card system suitable for practicing the present invention.

FIG. 1d is an illustration of an exemplary smart card system 185 including smart card reader 102, smart card 110, and smart card enabler 120. For purposes of explanation, smart card enabler 120 operate in a similar manner as in smart card enabler 120 of exemplary smart card systems 170, 175, and 180. Also, for purposes of explanation, RF circuitry 106 and micro-circuitry 104 of smart card 110 operate in a similar manner as RF circuitry 106 and micro-circuitry 104 of exemplary smart card systems 170, 175, and 180.

In one embodiment, smart card 110 is a contact-less smart card including RF circuitry 106 and micro-circuitry 104, which communicates with smart card reader 102 using RF signals through RF circuitry 106. Smart card reader 102 lacks an opening for inserting smart card 110 and includes RF circuitry (not shown) to communicate with smart card 110 using RF signals to perform a transaction. For example, smart card 110 may be placed in front of smart card reader 102. In such an arrangement, smart card 110 and smart card reader 102 communicate using RF signals. Smart card 110 and smart card reader 102 may communicate using any known RF communication protocols. Smart card enabler 120 provides RF power to smart card 110 using RF signals. Smart card reader 102 may also provide RF power to both smart card 110 and smart card enabler 120 using RF signals. Alternatively, smart card 110 may be a contactless smart card in all exemplary embodiments.

Figure 2:
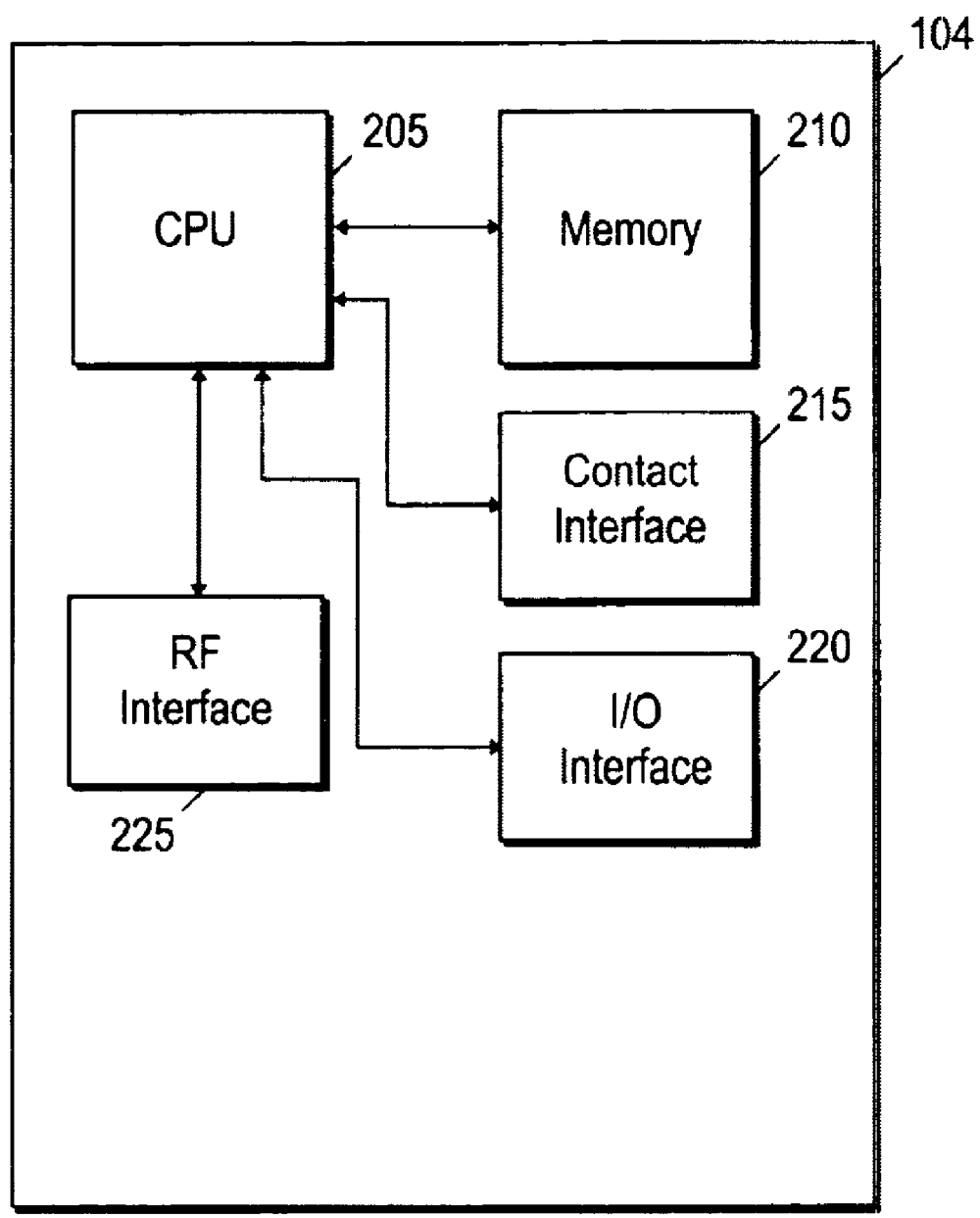
FIG. 2 is a block diagram of one embodiment of microcircuitry within a smart card.

FIG. 2 is a block diagram of one embodiment of micro-circuitry 104 of smart card 110. Micro-circuitry 104 includes a CPU 205 coupled with memory 210, contact interface 215, I/0 interface 220, and RF interface 225. CPU 205 is a microprocessor for smart card 110. Memory 210 may be a random access memory (RAM), read only memory (ROM), flash memory, or other suitable memory. Contact interface 215 is a connection between CPU 205 and contact 103. I/O interface 220 is a connection between CPU 205 and an I/O device such as, for example, a key pad. Any number of I/O devices, however, may be connected to smart card 110 through I/O interface 220 such as, for example, a display. RF interface 225 is a connection between CPU 205 and RF circuitry 106.

Memory 210 stores an identification key, transaction key, and last transaction value for smart card 110. Memory 210 may also store other types of information such as, for example, configuration information, program code information, and other like information.

Smart card 110 uses CPU 205 to transmit an identification key stored in memory 210 to smart card enabler 120 through RF interface 225 and RF circuitry 106 using RF signals.

Smart card 110 also uses CPU 205 to process and store a transaction key in memory 210. Smart card 110 also uses CPU 205 to transmit the transaction key stored in memory 210 to smart card enabler 120 through RF interface 225 and RF circuitry 106 using RF signals. Smart card 110 also uses CPU 205 to process and store a last transaction value in memory 210. Smart card 110 also uses CPU 205 to transmit the last transaction value to smart card reader 102 through contact interface 215, and may also transmit the last transaction value to smart card enabler 120 through RF interface 225 and RF circuitry 106 using RF signals.

Figure 3:
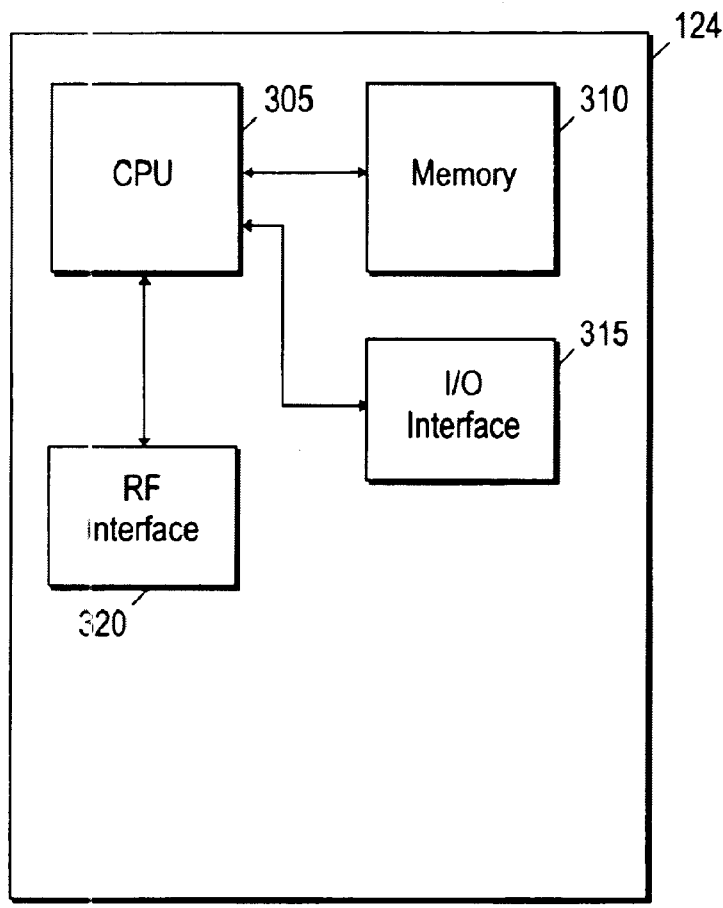
FIG. 3 is a block diagram of one embodiment of microcircuitry within a smart card enabler.

FIG. 3 is a block diagram of one embodiment of micro-circuitry 124 of smart card enabler 120. Micro-circuitry 124 includes a CPU 305 coupled with memory 310, I/O interface 315, and RF interface 320. CPU 305 is a microprocessor for smart card enabler 120. Memory 310 may be a random access memory (RAM), read only memory (ROM), flash memory, or other suitable memory. I/O interface 315 is a connection between CPU 305 and an I/O device such as, for example, a key pad. Any number of I/O devices, however, may be connected to smart card enabler 120 through I/O interface 315 such as, for example, a display. RF interface 320 is a connection between CPU 305 and RF circuitry 122.

Memory 310 stores an identification key, transaction key, and last transaction value for smart card enabler 120. Memory 310 may also store other types of information such as, for example, configuration information, program code information, and other like information.

Smart card enabler 120 uses CPU 305 to receive an identification key, transaction key, and a last transaction value from smart card 110 through RF circuitry 122 and RF interface 320. Smart card enabler uses CPU 305 to compare the received identification key with a stored identification key in memory 310. If the comparison indicates the received identification key matches the stored identification key in memory 310, smart card enabler 120 uses CPU 305 to transmit an identification enable signal to smart card 110 through RF interface 320 and RF circuitry 122 to enable smart card 110 to function with smart card reader 102.

Smart card enabler 120 also uses CPU 305 to compare the received transaction key with a stored transaction key in memory 310. If the comparison indicates the received transaction key matches the stored transaction key in memory 310, smart card enabler 120 uses CPU 305 to transmit a transaction enable signal to smart card 110 through RF interface 320 and RF circuitry 122 to enable smart card 110 to perform a transaction with smart card reader 102. In one embodiment, after a transaction is performed, either CPU 205 of smart card 110 or CPU 305 of smart card enabler 120 may generate a new transaction key to stamp or identify the last transaction. The new transaction key replaces the old transaction key stored in memory 210 of smart card 110 and memory 310 of smart card enabler 120.

Figure 4A:
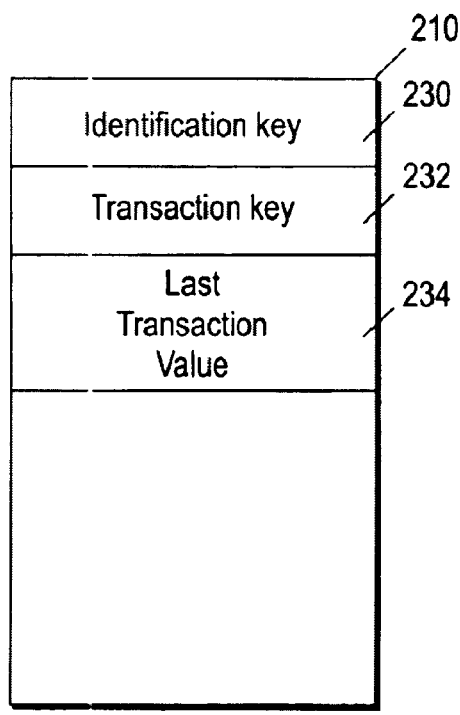
FIG. 4*a* is a block diagram of one embodiment of a memory within a smart card.

FIG. 4a is a block diagram of one embodiment of memory 210 of smart card 110. Referring to FIG. 4a, memory 210 includes an identification key 230, transaction key 232, and last transaction value 234. Identification key 230 is a 128-bit fixed number, which is typically issued by the smart card issuer. Identification key 230 may also be hard wired into micro-circuitry 104. Identification key 230 may also be of any size and have any number of data types such as, for example, mixed numbers and characters. Smart card 110 is configured to be unable to alter identification key 230. Smart card 110 transmits identification key 230 to smart card enabler 120 to be authenticated by smart card enabler 120 with a stored identification key in order to enable smart card 110 to function with smart card reader 102.

Transaction key 232 is a randomly generated number created by smart card 110. Alternatively, transaction key 232 is randomly generated by smart card enabler 120. Smart card 110 creates transaction key 232 after a transaction is performed to stamp or identify the transaction. Transaction key 232 may also be of any size and include any number of data types such as, for example, mixed number and characters. For example, transaction key 232 may be a number such as, for example, 034 that is randomly generated. After a transaction is performed a new transaction key is created that identifies the performed transaction such as, for example, 042. Transaction key 232 is transmitted to smart card enabler 120 to be authenticated with a stored transaction key. Smart card 140 may also be modified to generate transaction key 232, for example, smart card 110 may include a co-processor to generate transaction key 232.

Last transaction value 234 is electronic cash value information representing the current amount of hard currency available to a user of smart card 110 in electronic form as a result of a previous transaction. For example, a transaction requiring five dollars to purchase a good is deducted from last transaction value 234 of smart card 110. That is, if last transaction value 234 indicated fifty dollars, after the five dollar transaction, smart card 110 would update last transaction value 234 to represent forty five dollars available to a user electronically. After a transaction is performed, smart card 110 transmits last transaction value 234 to smart card enabler 120 to be stored in smart card enabler 120.

Figure 4B:
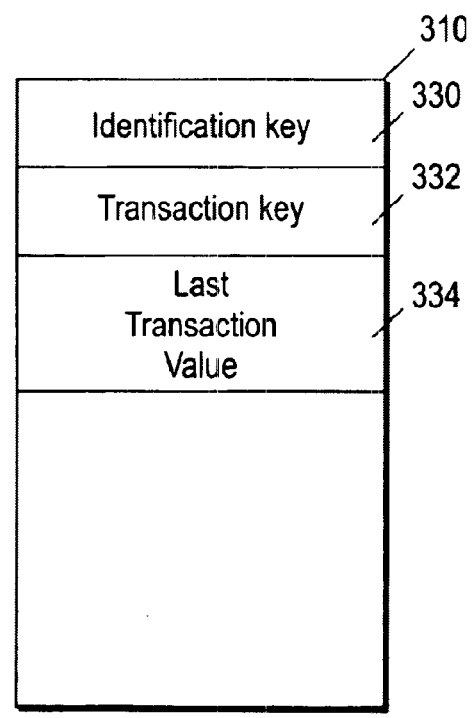
FIG. 4*b* is a block diagram of one embodiment of a memory within a smart card enabler.

FIG. 4b is a block diagram of one embodiment of memory 310 of smart card enabler 120. Referring to FIG. 4b, memory 310 within micro-circuitry 124 of smart card enabler 120 includes identification key 330, transaction key 332, and last transaction value 334. While smart card 110 is enabled, identification key 330, transaction key 332, and last transaction value 334 stored in memory 310 of smart card enabler 120 is synchronized to be the same as identification key 230, transaction key 232, and last transaction value 234 in memory 210 of smart card 110.

Smart card enabler 120 authenticates identification key 230 and transaction key 232 from smart card 110 with identification key 330 and transaction key 332 stored in memory 310. If the identification key 230 matches identification key 330, smart card enabler 120 enables smart card 110 to function with smart card reader 102, for example, smart card enabler 120 transmits an identification enable signal to smart card 110. Before a transaction is performed, smart card enabler 120 receives transaction key 232 and compares transaction key 232 with transaction key 332. If transaction key 232 matches transaction key 332, smart card enabler 120 enables smart card 110 to perform a transaction with smart card reader 102, for example, smart card enabler transmits a transaction enable signal to smart card reader 102. After a transaction is performed, smart card 110 transmits last transaction value 234 to smart card enabler 120 and stores it as last transaction value 334. If last transaction value 234 is incapable of being retrieved from smart card 110, last transaction value 234 can be recovered by using last transaction value 334 which is the same as last transaction value 234. Thus, even if smart card 110 is lost, damaged, or destroyed, a user of smart card 110 can retrieve last transaction value 334 that is the same as last transaction value 234 in smart card 110.

Figure 5:
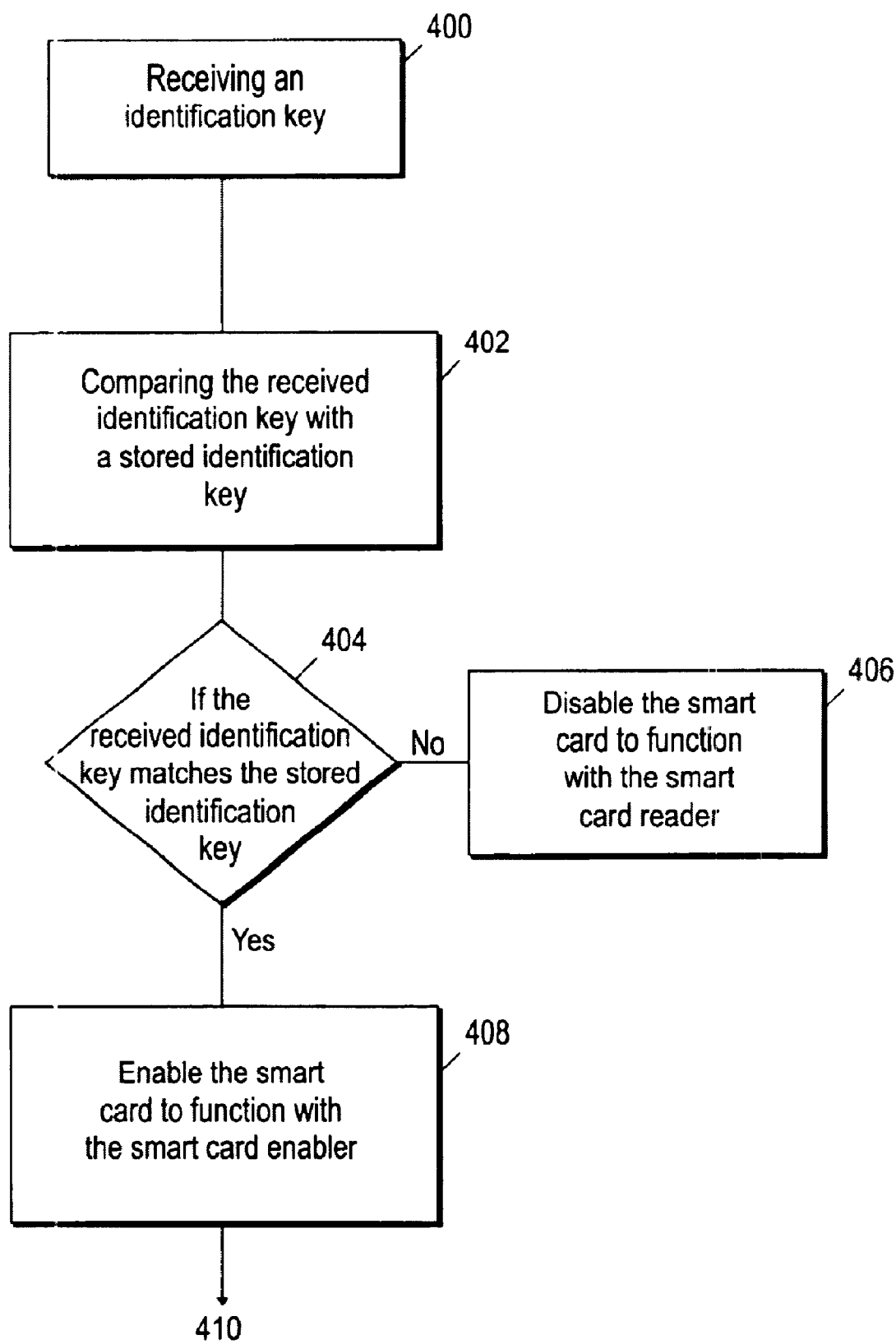
FIG. 5 is a flowchart representing a process for enabling a smart card to function with a smart card reader.

FIG. 5 is a flowchart representing a process for enabling smart card 110 to function with smart card reader 102. The process for enabling smart card 110 to function with smart card reader 102 requires authenticating identification key 230 of smart card 110 with identification key 330 of smart card enabler 120. In one embodiment, the process is initiated automatically after smart card 110 is inserted into smart card reader 102 or placed in front of smart card reader 102. Thus, no special action or procedure is needed by a user of smart card 110 to enable smart card 110 to function with smart card reader 102. As long as the user carries smart card enabler 120 that is within a close proximity of smart card 110, smart card 110 becomes enabled to function automatically with smart card reader 102 if identification key 230 matches identification key 330.

For purposes of explanation, the process begins at step 400. At step 400, smart card enabler 120 receives identification key 230 stored in memory 210 in smart card 110. Smart card enabler 120 receives identification key 230 periodically while smart card 110 is being used. Hence, smart card 110 is enabled periodically to function with smart card reader 102 while it is being used. At step 402, after receiving identification key 230, smart card enabler 120 compares identification key 230 with identification key 330 stored in memory 310 of smart card enabler 120. At step 404, smart card enabler 120 compares identification key 230 with identification key 330 to determine if the identification keys match or are identical.

At step 406, if the comparison of identification key 230 with identification key 330 indicates that identification key does not match identification key 330, smart card 110 is disabled and will not function with smart card reader 102. Smart card 110 is disabled to function with smart card reader 102 by not receiving an identification enable signal from smart card enabler 120. Smart card 110 is configured such that it will be rendered invalid and inoperable unless it is enabled by smart card enabler 120.

At step 408, if the comparison of identification key 230 with identification key 330 indicates that identification key 230 is the same as identification key 330, smart card enabler 120 enables smart card 110 to function with smart card reader 102. Smart card enabler 120 transmits remotely an identification enable signal using RF signals that must be received by smart card 110 to function with smart card reader 102. Smart card 110 is configured such that if it does not receive the identification enable signal from smart card enabler 120, smart card 110 will not function with smart card reader 102 and no transaction will be performed.

Figure 6:
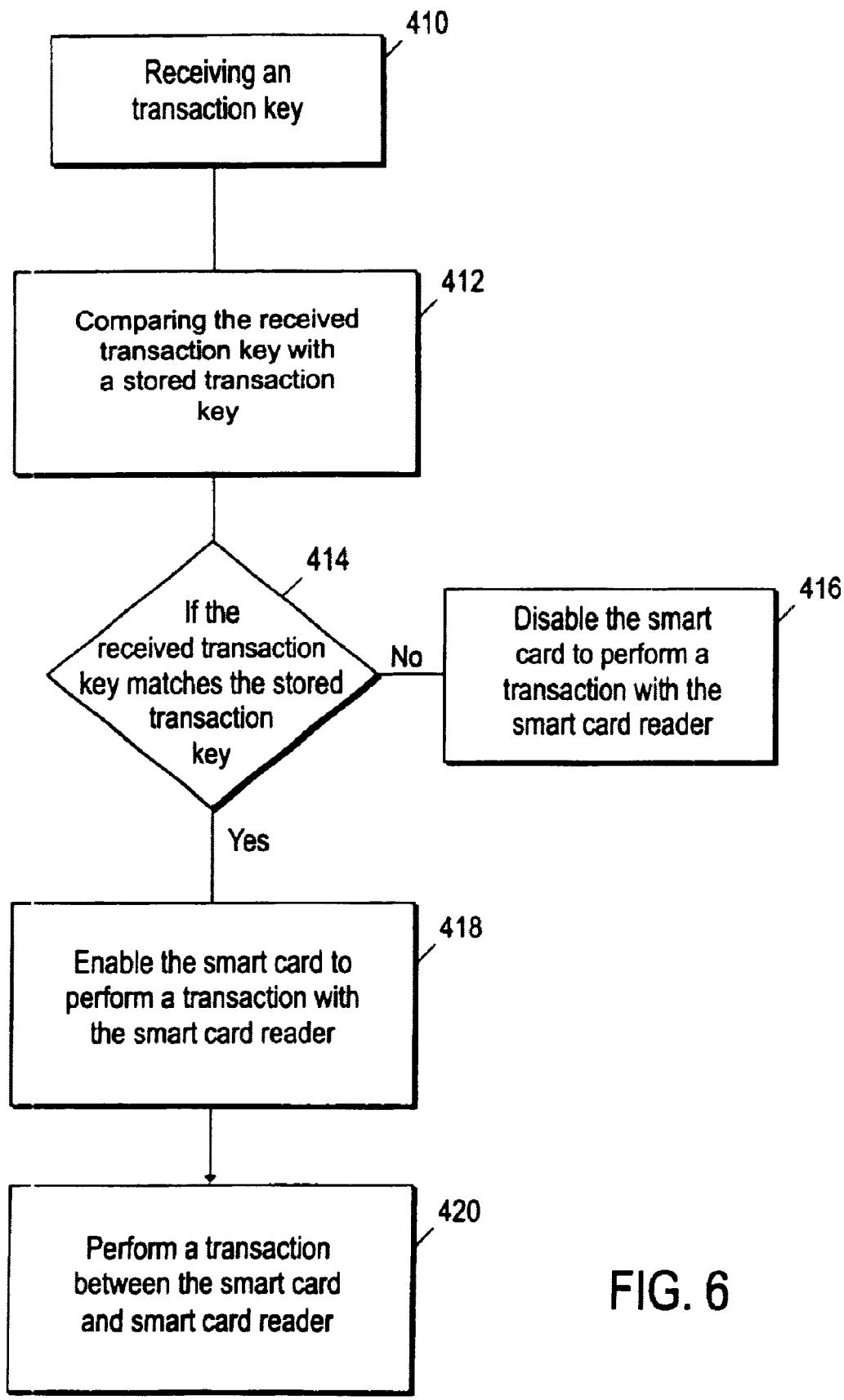
FIG. 6 is a flow chart representing a process for enabling a smart card to perform a transaction with a smart card reader.

FIG. 6 is a flow chart representing a process for enabling smart card 110 to perform a transaction with smart card reader 102. The process for enabling smart card 110 to perform a transaction with smart card reader 102 requires authenticating transaction key 232 of smart card 110 with transaction key 332 of smart card enabler 120. The process is initiated automatically after smart card 110 has been enabled to function with smart card reader 102. Thus, no special action or procedure is needed by a user of smart card 110 to enable smart card 110 to perform a transaction with smart card reader 102. As long as the user carries smart card enabler 102 within a close proximity of smart card 110, smart card 110 becomes enabled automatically to perform a transaction with smart card reader 102.

For purposes of explanation, the process begins at step 410. At step 410, smart card enabler receives transaction key 232 stored in memory 210 from smart card 110. At step 412, smart card enabler 120 compares the received transaction key 232 with transaction key 332 stored in memory 310 of smart card enabler 120 to determine if transaction key 232 matches or is identical to transaction key 332.

At step 416, if the comparison between transaction key 232 and transaction key 332 indicates that transaction key 232 does not match transaction key 332, then smart card 110 is disabled to perform a transaction with smart card reader 102. In one embodiment, smart card 110 is disabled to perform a transaction with smart card reader 102 by not receiving a transaction enable signal from smart card enabler 120. Smart card 110 is configured such that it is disabled and cannot perform a transaction with smart card reader 102 unless it receives the transaction enable signal from smart card enabler 120.

At step 418, if the comparison between transaction key 232 and transaction key 332 indicates that transaction key 232 matches transaction key 332, smart card enabler 120 will enable smart card 110 to perform a transaction with smart card reader 102. Smart card enabler 120 transmits remotely a transaction enable signal using RF signals to smart card 110. Smart card 110 is configured such that if it does not receive the transaction enable signal from smart card enabler 120, smart card 110 is disabled and will not perform a transaction with smart card reader 102.

At step 420, after being enabled to perform a transaction, a transaction is performed between smart card 110 and smart card reader 102. If no transaction is performed after step 418, the process returns to step 410. The transaction is performed as a result of the smart card 110 receiving the identification enable signal and the transaction enable signal from smart card enabler 120.

Figure 7:
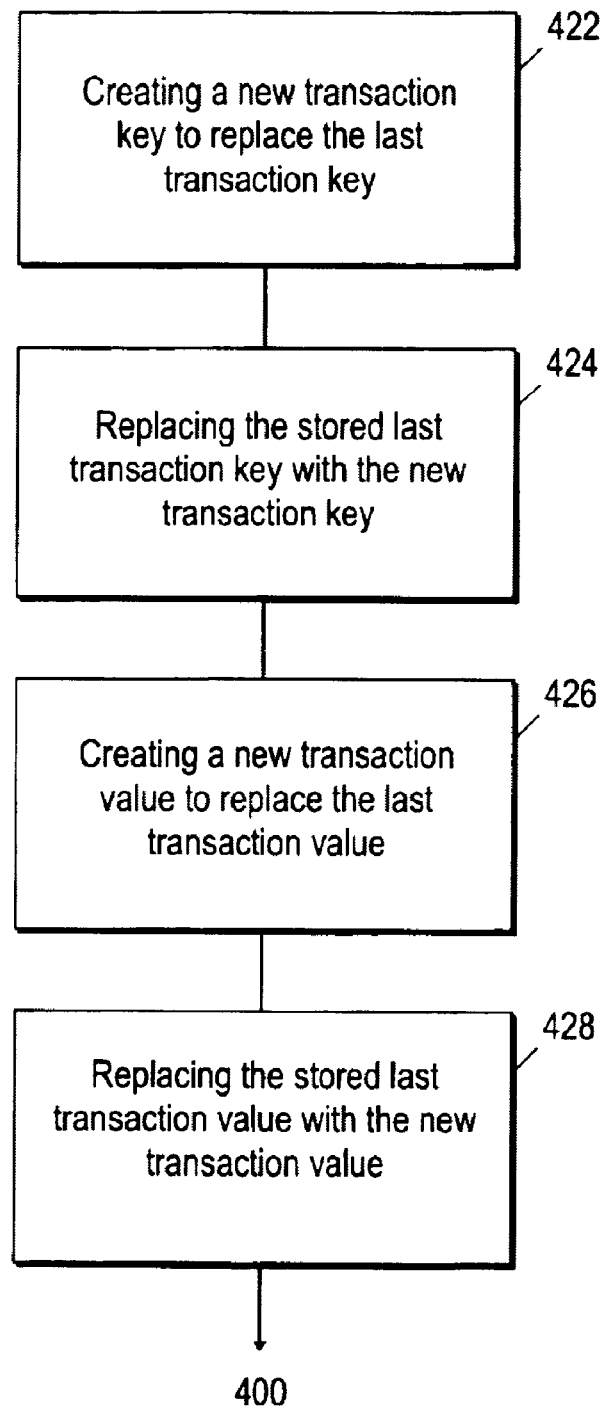
FIG. 7 is a flow chart representing a process for synchronizing information of a smart card with a smart card enabler.

FIG. 7 is a flow chart representing a process for synchronizing transaction key 232 and last transaction value 234 of smart card 110 with transaction key 332 and last transaction value 334 of smart card enabler 120. The synchronizing process ensures that transaction key 232 and last transaction value 234 of smart card 110 represents the same information as transaction key 332 and last transaction value 334 of smart card enabler 120. By storing last transaction value 334 in smart card enabler 120, which includes the same information as last transaction value 234 in smart card 110, a user can recover last transaction value 234 in a smart card 110 that has become lost, damaged, or destroyed by using last transaction value 334 in smart card enabler 120. Also, after each transaction a new transaction key is created to stamp or identify the last transaction performed by smart card 110.

For purposes of explanation, the process begins at step 422. After smart card 110 and smart card reader 102 perform a transaction, at step 422, smart card 110 creates a new transaction key to replace an old transaction key 232. In one embodiment, smart card 110 randomly generates the new transaction key. At step 424, smart card 110, stores the new transaction key into memory 210 as transaction key 232, which replaces the last transaction key.

Also, after smart card 110 and smart card reader 102 perform a transaction, smart card 110 creates a new transaction value. For example, smart card 110 may have stored last transaction value 234 representing fifty dollars in electronic form. If a transaction for a good or service costs ten dollars, last transaction value 234 will store forty dollars in electronic form as a result of the transaction. Smart card 110 transmits last transaction value 234 to smart card enabler 120, which stores last transaction value 234 from smart card 110 in memory 310 as last transaction value 334. In one embodiment, last transaction value 234 includes the same information as last transaction value 334. By storing last transaction value 334 in memory 310 of smart card enabler 120, if last transaction value 234 is incapable of being retrieved from smart card 110, last transaction value 234 can be recovered by using last transaction value 334 which includes the same information as in last transaction value 234. The issuer of smart card enabler 120 may determine if smart card 120 is authenticate and may issue a new smart card 110 having last transaction value 334 in smart card enabler 120.

Figure 8:
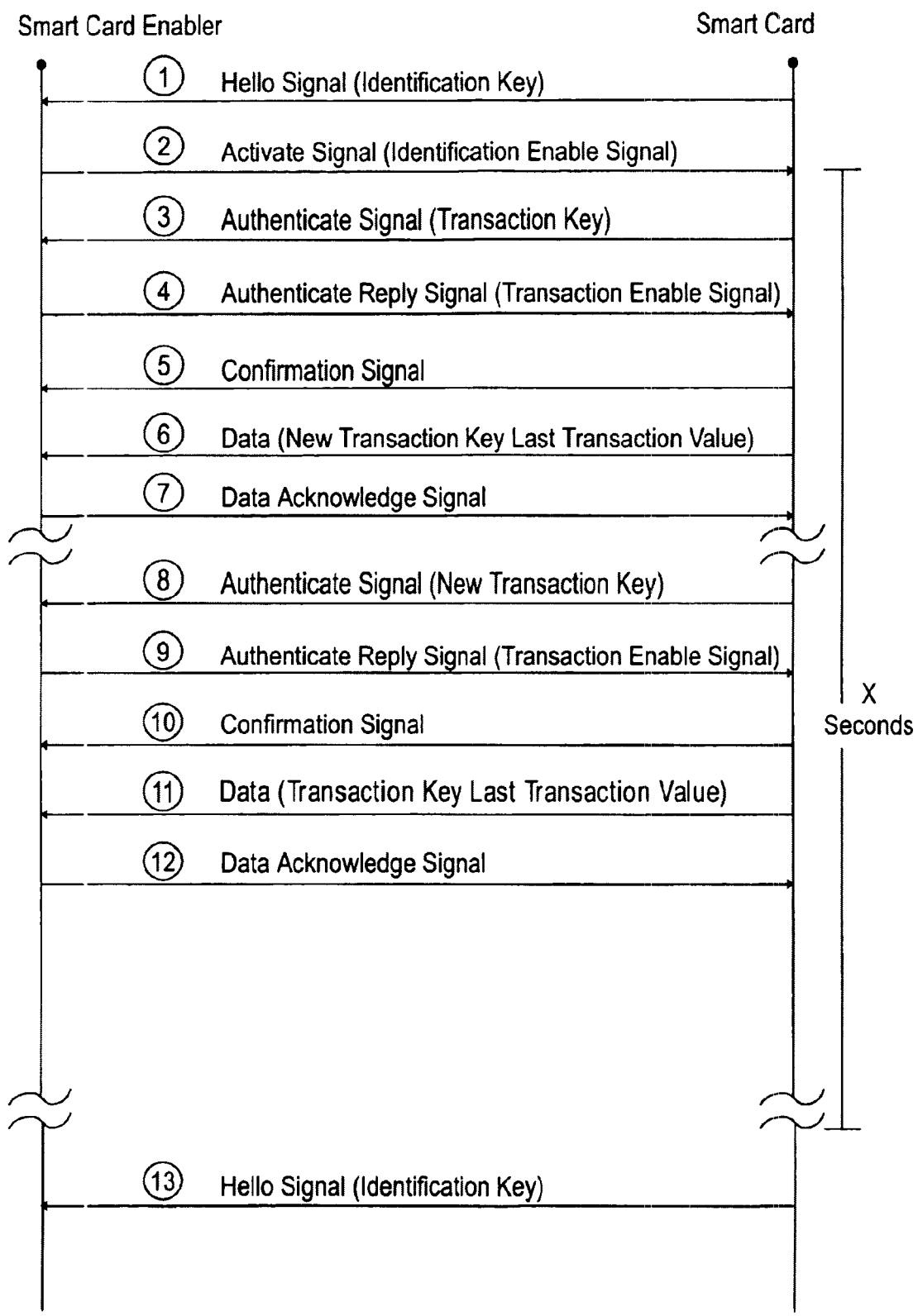
FIG. 8 is a diagram of an exemplary communication protocol for using a smart card.

FIG. 8 is a diagram of an exemplary communication protocol for using smart card 110. The exemplary conmuunication protocol is for explanation purposes and may have many variations. For purposes of explanation all communication between smart card 110 and smart card enabler 120 are conducted using radio signals by RF circuitry 106 and RF circuitry 122, respectively. Also, for purposes, of explanation signals communicated between smart card 110 and smart card enabler 120 may include bits, packets, or other binary information.

Referring to FIG. 8, at reference point 1, a transaction is initiated when smart card 110 is inserted into or placed in front of smart card reader 102. Once a transaction is initiated, smart card 110 sends a hello signal to smart card enabler 120. In one embodiment, the hello signal includes identification key 230 to identify itself to smart card enabler 120. Smart card 110 transmits the hello signal automatically to smart card enabler 120. Smart card 110 transmits the hello signal periodically after X seconds as long as smart card 110 is inserted in or placed in front of smart card reader 102. Smart card 110 may also be configured to transmit the hello signal during any X amount of seconds.

At reference point 2, upon receiving the hello signal including identification key 230, smart card enabler 120 will authenticate identification key 230 with identification key 330 stored in memory 310. If identification key 230 matches identification key 330, smart card enabler 120 will send an activate signal to smart card 110 to acknowledge receipt of the hello signal. In one embodiment, the activate signal includes an identification enable signal that enables smart card 110 to function with smart card reader 102. Alternatively, smart card enabler 120 can transmit the activate signal to smart card 110 manually by a user pressing a button on smart card enabler 120 to transmit the activate signal to smart card 110.

At reference point 3, after being enabled to function with smart card reader 102, smart card 110 transmits an authenticate signal to smart card enabler 120. The authenticate signal includes transaction key 232, which must be authenticated by smart card enabler 120 with transaction key 332 stored in memory 310 in order for smart card 110 to perform a transaction with smart card reader 102.

At reference point 4, after receiving the authenticate signal, smart card enabler 120 compares transaction key 232 with transaction key 332. In one embodiment, if transaction key 232 matches transaction key 332, smart card enabler 120 transmits an authenticate reply to acknowledge receipt of the authenticate signal to smart card 110. The authenticate replay signal includes a transaction enable signal to enable smart card 110 to perform a transaction with smart card reader 102.

At reference point 5, after receiving the transaction enable signal, smart card 110 transmits a confirmation signal to smart card enabler 120 to signal an active period for smart card 110 to perform a transaction with smart card reader 102. In one embodiment, a transaction should occur during the active period. In one embodiment, a transaction to deduct the value represented by last transaction value 234 in smart card 110 should occur during the active period. If, however, a transaction is not completed within the active period, the communication protocol resumes again at reference point 1 and continues through reference point 5.

At reference point 6, if a transaction is performed, smart card 110 generates a new transaction key 232 (after the transaction) and replaces an old transaction key 232 (before the transaction). Smart card 110 also deducts from last transaction value 234 cash value resulting from the transaction. For example, before a transaction, last transaction value 234 may represent fifty dollars electronically. After a transaction for five dollars, last transaction value 234 representing fifty dollars is deducted to represent forty five dollars. Thus, smart card 110 transmits data that includes an updated new transaction key 232 and updated last transaction value 234 to smart card enabler 120.

At reference point 7, after receiving the updated transaction key 232 and updated last transaction value 234, smart card enabler stores the received transaction key 232 and last transaction value 234 in memory 310 as transaction key 332 and last transaction value 334. Smart card enabler 120 also transmits a data acknowledge signal that confirms receipt of the data from smart card 110. If a user wishes to perform another transaction the communication protocol continues through reference points 8 through 12, which performs the same operation as reference points 3 through 7. During the process through reference points 8 through 12, a user might issue a challenge to smart card enabler 120 to request authentication of transaction key 232 or identification key 234 and repeat, for example, the operation at reference points 1 through 5.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A smart card comprising:

an interface with a smart card reader;

first circuitry configured to receive a first enable signal from a portable smart card enabler device, wherein the first enable signal is transmitted to the first circuitry without passing through the smart card reader;

second circuitry coupled with the interface and the first circuitry and configured to allow the smart card to function with the smart card reader upon receiving the first enable signal from the portable smart card enabler device by the first circuitry, and to disable the smart card to function with the smart card reader if the first circuitry does not receive the first enable signal from the portable smart card enabler device; and wherein the first circuitry is also configured to receive a second enable signal from the portable smart card enabler device, and wherein the second circuitry is also configured to allow the smart card to perform a transaction with the smart card reader upon receiving the second enable signal from the portable smart card enabler device by the first circuitry, and to disable the smart card to perform the transaction with the smart card reader if the first circuitry does not receive the second enable signal from the portable smart card enabler device.

2. The smart card of claim 1, wherein the first enable signal and the second enable signal are radio frequency signals.

3. The smart card of claim 1, wherein the second circuitry is also configured to disable the smart card to perform the transaction after a predetermined time period.

4. The smart card of claim 1, wherein the second circuitry performs the transaction with the smart card reader through the interface after receiving the first enable signal and the second enable signal from the portable smart card enabler device.

5. The smart card of claim 4, wherein the second circuitry performs the transaction for the smart card that is within a close proximity of the smart card enabler.

6. The smart card of claim 1, wherein the second circuitry includes:

a memory storing first identification key and a first transaction key; and a central processing unit coupled to the memory and configured to send the first identification key and a first transaction key to the portable smart card enabler device, and wherein the first enable signal and the second enable signal are received from the portable smart card enabler device based on the a first identification key and first transaction key.

7. The smart card of claim 6, wherein the memory also stores a first transaction value, the first transaction value representing an available amount of hard currency in electronic form for the smart card, and wherein the central processing unit is also configured to send the first transaction value to the portable smart card enabler device such first transaction value is stored in the portable smart card enabler device.

8. The smart card of claim 7, wherein the central processing unit is also configured to generate a second transaction value as a result of a transaction and replace the first transaction value with the second transaction value.

9. The smart card of claim 8, wherein the central processing unit is also configured to generate a second transaction key to replace the first transaction key and transmit the second transaction key and second transaction value to the portable smart card enabler device.

10. A smart card, comprising:
   a) a first interface through which communications with a portable smart card enabler device are transported;
   b) a second interface through which communications with a smart card reader are transported;
   c) memory to store an identification key, a transaction key and a transaction value; and
   d) a processor to:
      1) send said identification key to said portable smart card enabler device through said first interface;
      2) send said transaction key to said portable smart card enabler device through said first interface as a consequence of said smart card receiving a first enable signal from said portable smart card enabler device without passing through the smart card reader, said first enable signal sent in response to said sending of said identification key;
      3) send said transaction value to said smart card reader through said second interface in order to entertain a transaction, said transaction value being sent as a consequence of said smart card receiving a second enable signal from said portable smart card enabler device, said second enable signal sent in response to said sending of said transaction key.

11. The smart card of claim 10 wherein said second interface further comprises a contact interface.

12. The smart card of claim 11 wherein said first interface further comprises an RF interface.

13. The smart card of claim 10 wherein said first interface further comprises an RF interface.

14. The smart card of claim 10 wherein said smart card further comprises an I/O interface coupled to said processing unit.

15. The smart card of claim 14 wherein said I/O interface further comprises a key pad.

16. The smart card of claim 14 wherein said I/O interface further comprises a display.

17. The smart card of claim 10 wherein said smart card is further configured to create and store a new transaction key as a consequence of a new transaction value having been received from said smart card reader, said new transaction key stored into said memory resource, said new transaction value reflecting said transaction value less a cost for said transaction.

18. The smart card of claim 17 wherein said smart card is further configured to send said new transaction key and said new transaction value to said portable smart card enabler device.

19. The smart card of claim 18 wherein said smart card is further configured to generate said new transaction key by generating a random number.

20. A method, comprising:
   a) sending an identification key from a smart card to a portable smart card enabler device through a first smart card interface;
   b) sending a transaction key from said smart card to said portable smart card enabler device through said first interface as a consequence of said smart card receiving a first enable signal from said portable smart card enabler device, said first enable signal sent in response to said sending of said identification key; and,
   c) sending a transaction value from said smart card to a smart card reader through a second smart card interface in order to entertain a transaction, said transaction value being sent as a consequence of said smart card receiving a second enable signal from said portable smart card enabler device, said second enable signal sent in response to said sending of said transaction key without passing through the smart card reader.

21. The method of claim 20 wherein said second smart card interface further comprises a contact interface.

22. The method of claim 21 wherein said first smart card interface further comprises an RF interface.

23. The method of claim 20 wherein said first smart card interface further comprises an RF interface.

24. The method of claim 20 further comprising creating and storing a new transaction key on said smart card as a consequence of a new transaction value having been received from said smart card reader, said new transaction value reflecting said transaction value less a cost for said transaction.

25. The method of claim 24 further comprising sending said new transaction key and said new transaction value from said smart card to said portable smart card enabler device 26. The method of claim 25 wherein said creating said new transaction key further comprises generating a random number.

* * * * *